(12) United States Patent
Murakami

(10) Patent No.: US 7,149,601 B2
(45) Date of Patent: Dec. 12, 2006

(54) METHOD AND APPARATUS FOR FRICTION AGITATION PROCESSING

(75) Inventor: Kotoyoshi Murakami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 305 days.

(21) Appl. No.: 10/697,702

(22) Filed: Oct. 31, 2003

(65) Prior Publication Data

US 2004/0162635 A1    Aug. 19, 2004

(30) Foreign Application Priority Data

Nov. 1, 2002   (JP) ............................. 2002-319407

(51) Int. Cl.
*G06F 19/00* (2006.01)

(52) U.S. Cl. ...................... 700/245; 700/246; 700/247; 700/248; 228/2.1; 228/112.1

(58) Field of Classification Search ................ 700/245; 228/2.1, 112.1

See application file for complete search history.

(56) References Cited

U.S. PATENT DOCUMENTS

| | | | |
|---|---|---|---|
| 4,252,587 A | | 2/1981 | Harden et al. |
| 6,068,178 A | * | 5/2000 | Michisaka ............... 228/112.1 |
| 6,227,432 B1 | * | 5/2001 | Enomoto et al. ........ 228/112.1 |
| 6,377,869 B1 | | 4/2002 | Watanabe et al. |
| 6,789,722 B1 | * | 9/2004 | Murakami ............... 228/112.1 |
| 2004/0134058 A1 | * | 7/2004 | Murakami ................... 29/505 |
| 2004/0144830 A1 | * | 7/2004 | Murakami ............... 228/112.1 |
| 2005/0082341 A1 | * | 4/2005 | Murakami ............... 228/112.1 |
| 2005/0092809 A1 | * | 5/2005 | Murakami ................. 228/2.1 |
| 2005/0145678 A1 | * | 7/2005 | Murakami ............... 228/112.1 |

FOREIGN PATENT DOCUMENTS

| | | |
|---|---|---|
| EP | 0 553 885 A1 | 8/1993 |
| EP | 1 153 694 A2 | 11/2001 |
| JP | 2001-340977 | 12/2001 |
| WO | WO 02/078893 A2 | 10/2002 |

OTHER PUBLICATIONS

Patent Abstracts of Japan vol. 2000, No. 5, Sep. 14, 2000, & JP 2000 042759 A (Showa Alum Corp) Feb. 15, 2000*Abstract*.
European Search Report Dated Mar. 22, 2004.

* cited by examiner

*Primary Examiner*—Thomas G. Black
*Assistant Examiner*—McDieunel Marc
(74) *Attorney, Agent, or Firm*—Nixon Peabody LLP; Donald R. Studebaker

(57) ABSTRACT

In a friction agitation processing for processing a workpiece by penetrating a rotating processing tool into the workpiece keeping rotation, upon an occurrence of an emergency in execution of friction agitation processing, the processing tool is removed from the workpiece after a finishing time of scheduled friction agitation processing and thereafter stopped in rotation, so as thereby to prevent the processing tool from being locked in the workpiece.

5 Claims, 6 Drawing Sheets

METHOD AND APPARATUS FOR FRICTION AGITATION PROCESSING

BACKGROUND OF THE INVENTION

1. Field of the Invention

The present invention relates to a method and an apparatus for friction agitation welding.

2. Description of Related Art

Robot controllers for spot welding have a function of monitoring abnormalities of robot operation to prevent an accident by forcibly terminating the robot operation at a lapse of a specified time for which an arcing command is present from an occurrence of an irregular stop of the robot. Such a robot controller is known from, for example, U.S. Pat. No. 6,377,869 B1.

In the meantime, it has been known in the art to use a friction agitation process as a joint welding process or a surface finishing process. In the friction agitation process, rotational force must be exerted on a workpiece while urging a rotating tool and the workpiece together. While the tool is rotated and advanced to apply urging pressure and rotational force to the workpiece, friction heat is generated and to plasticize the workpiece material. As a result, the tool is allowed to penetrate the workpiece, so as thereby to cause a plastic flow of the workpiece material in the workpiece. In the case where the friction agitation process is used to weld superposed workpieces together, a spot weld is formed across a joint between the superposed workpieces resulting from a plastic flow occurring at an interface between the workpieces. On the other hand, in the case where the friction agitation process is used to finish a workpiece surface, the a plastic flow makes a surface texture of the workpiece dense, increasing mechanical strength of the workpiece.

In the friction agitation process, the rotating tool is unavoidably penetrated into a workpiece. When the rotating tool is urgently stopped due to an emergency of some kind while the rotating tool remain penetrated in the workpiece, the tool is locked in a solidified workiece material. This leads to causing damages of the tool and the workpiece if removing the tool from the workpiece with the strong hand.

SUMMARY OF THE INVENTION

It is therefore an object of the present invention to provide a friction agitation processing method of processing a workpiece by penetrating a processing tool into the workpiece keeping rotation in which a processing tool and a workpiece are prevented from being damaged resulting from an emergency stop of the processing tool.

It is another object of the present invention to provide a friction agitation processing apparatus for implementing the friction agitation processing method.

The foregoing objects of the present invention is accomplished by a friction agitation processing method of processing a workpiece by penetrating a processing tool into the workpiece keeping rotation and removing the processing tool from the workpiece after friction agitation processing, which comprises the steps of providing an emergency stop signal for demanding an emergency stop of the processing tool in execution of the friction agitation processing, removing the processing tool from the workpiece at appearance of the emergency stop signal, and stopping rotation of the processing tool after a removal of the processing tool from the workpiece.

The friction agitation processing method is implemented by an apparatus comprising emergency stop means for providing an emergency stop signal for an emergency stop of the processing tool in execution of the friction agitation processing, execution detection means for detecting execution of the friction agitation processing by the processing tool, and stop control means for stopping rotation of the processing tool after a removal of the processing tool from the workpiece at appearance of the emergency stop signal when the execution detection means detects execution of the friction agitation processing.

According to the friction agitation processing method of the present invention, as the processing tool is removed from a workpiece and, thereafter, stopped in rotation when the processing tool is demanded to stop in an emergency, the processing tool is prevented from being locked in the workpiece resulting from hardening of a workpiece material with the consequence that it is not necessary to drag away the processing tool locked in the workpiece by the strong hand. Therefore, both processing tool and workpiece are prevented from being damaged due to dragging away the processing tool from the workpiece when the processing tool is stopped in an emergency.

The removal of the processing tool from the workpiece is executed after a finishing time of scheduled friction agitation processing. This prevents the workpiece from getting defective due to an emergency stop of the friction agitation processing and allows the processing tool to be stopped with ordinary control for termination of the friction agitation processing.

The processing tool is stopped in rotation after a lapse of a predetermined period of time from appearance of the emergency stop signal. The predetermined period of time is set to expire after removal of the processing tool from the workpiece. The emergency stop control of the processing tool after a removal from the workpiece is readily realized by a substandard manner using a simple component such as a timer.

It is preferred to mount the processing tool to an automatic machine. The automatic machine is adapted to position the processing tool relatively to the workpiece and to stop coincidentally with a stop of rotation of the processing tool. This protects an operator safely after a removal of the processing tool from the workpiece.

The friction agitation processing method is applied to forming a weld across a joint between superposed metal plate workpieces with the same effects as described above.

According to the friction agitation processing apparatus of the present invention, as the processing tool is removed from the workpiece and, thereafter, stopped in rotation when the processing tool is demanded to stop in an emergency, the processing tool is prevented from being locked in the workpiece resulting from hardening of a workpiece material, so that both processing tool and workpiece are prevented from being damaged due to dragging away the processing tool from the workpiece by the strong hand when the processing tool is stopped in an emergency. Furthermore, the workpiece is prevented from getting defective due to an emergency stop of the friction agitation processing. In addition, it is allowed to employ ordinary control for termination of the friction agitation processing.

The stop control means may comprise timing means for providing a stop signal for stopping rotation of the processing tool after a finishing time of scheduled friction agitation processing conditionally upon an appearance of an emergency stop signal.

The processing tool is enclosed by a safety fence provided with a door and an electromagnetic lock for locking and unlocking the door. The electromagnetic lock keeps the door locked until the finishing time of scheduled friction agitation processing that is controlled by the timer means. The operator is prevented from entering the inside of the safety fence during operation of the timer means, so as thereby to be safely protected.

It is preferred to mount the processing tool to an automatic machine. The automatic machine is adapted to position the processing tool relatively to the workpiece and to stop coincidentally with a stop of rotation of the processing tool. This protects an operator more safely after a removal of the processing tool from the workpiece.

BRIEF DESCRIPTION OF THE DRAWINGS

The above and other objects and features of the present invention will be understood from the following description of a specific embodiment thereof when considering in conjunction with the accompanying drawings, wherein the same reference numerals denote same or similar parts throughout the drawings, and in which.

DETAILED DESCRIPTION OF THE SPECIFIC EMBODIMENT

Figure 1:
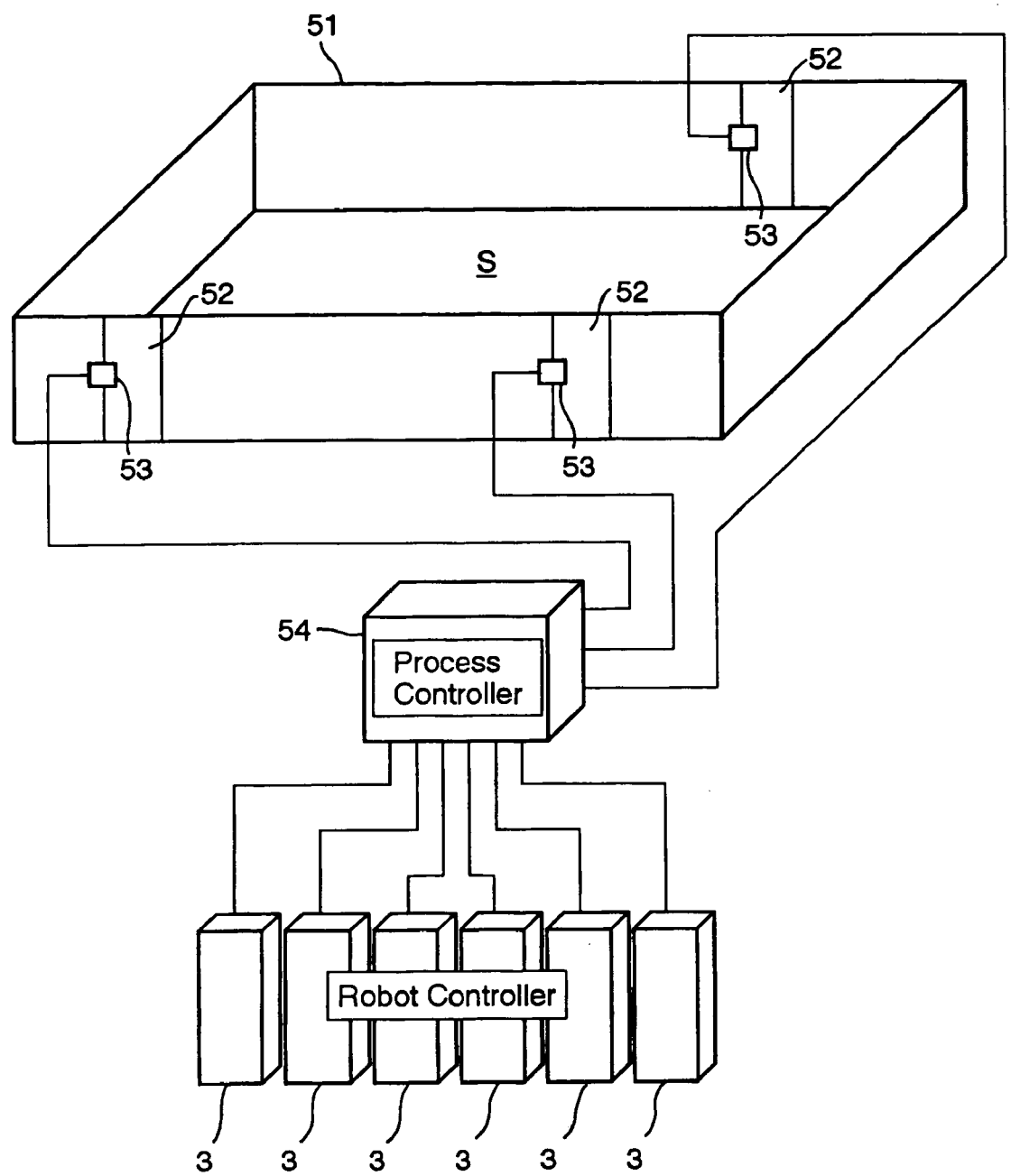
FIG. 1 is a schematic view of a friction agitation processing apparatus according to a preferred embodiment of the present invention.

A friction agitation process of the present invention will be hereafter described as used in welding workpieces together by way of example with reference to FIG. 1 showing a friction agitation welding system. As shown, a plurality of robotic processing machines A such as shown in FIG. 2 are arranged in a working area S surrounded with a safety fence 51.

Figure 2:
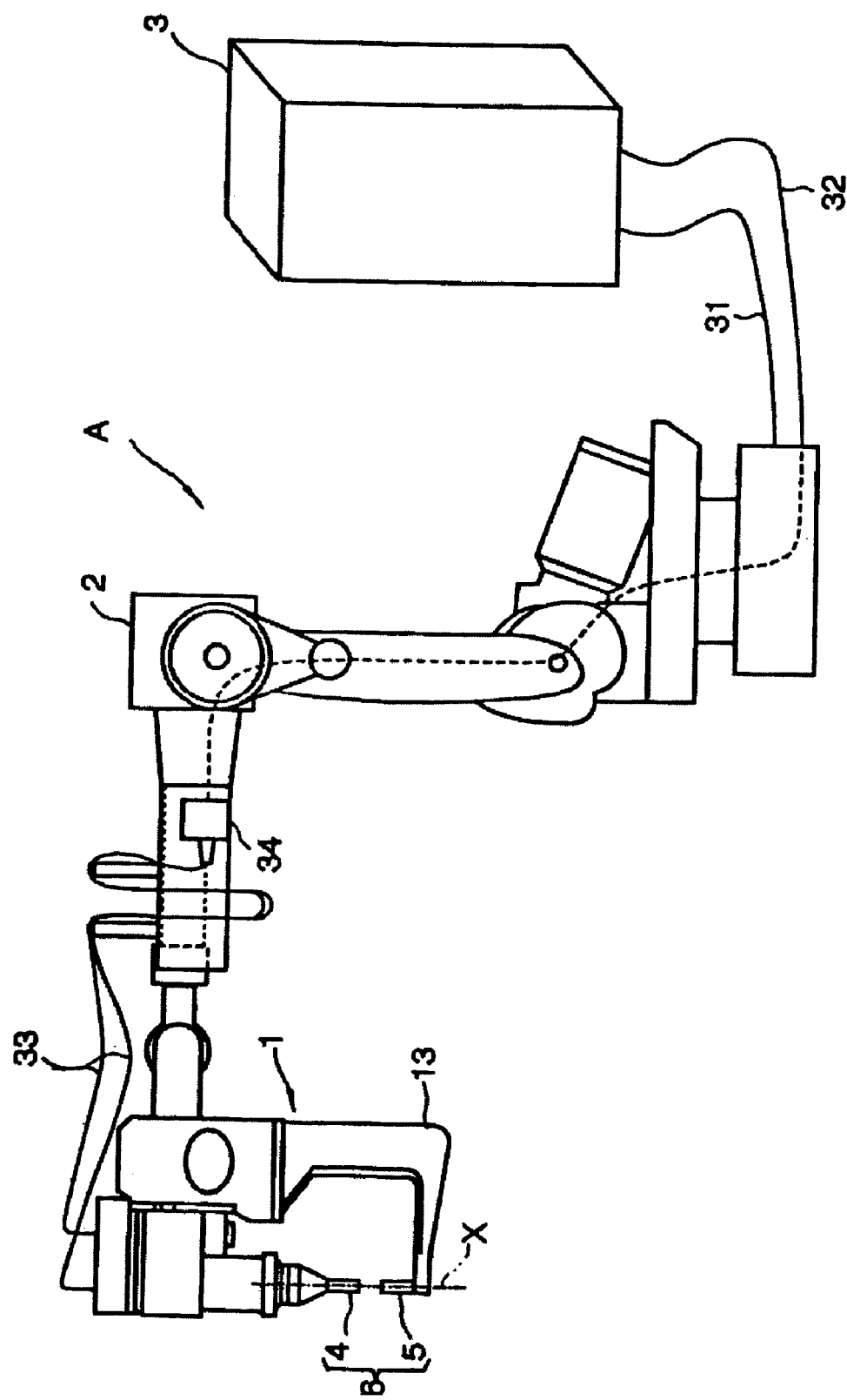
FIG. 2 is a schematic view of a robot including a friction agitation processing head.

Referring to FIG. 2, the robotic processing machine A used, for example, to form a weld across a joint between two superposed plate workpieces basically comprises a welding robot 2 having a robot arm with a welding head 1 and a control unit 3 for controlling operation of the welding robot 2 and the welding head 1. The welding robot 2 performs a sequential operation including moving the welding head 1 to a specified welding position from a waiting position (a home position), controlling the welding head 1 in position, operating the welding head 1 to form a weld across a joint between superposed metal plate workpieces W1 and W2 (see FIG. 3) and returning the welding head 1 to the waiting position from the welding position. A general purpose six-shafts vertical articulated manipulator may be employed for the welding robot 2. The welding head 1 comprises a generally L-shaped frame 13 and a friction agitation welding device 6 including two motors (not shown) mounted to the frame 13. the friction agitation welding device 6 comprises a rotatably driven friction agitation welding tool (which is referred to as a friction agitation welding tool for simplicity) 4 having a cylindrical friction agitation spindle and a back-up tool 5 which are aligned with an axis of welding X and spaced apart to define a work-receiving space Sw for receiving the superposed metal plate workpieces W1 and W2 therein.

Figure 3:
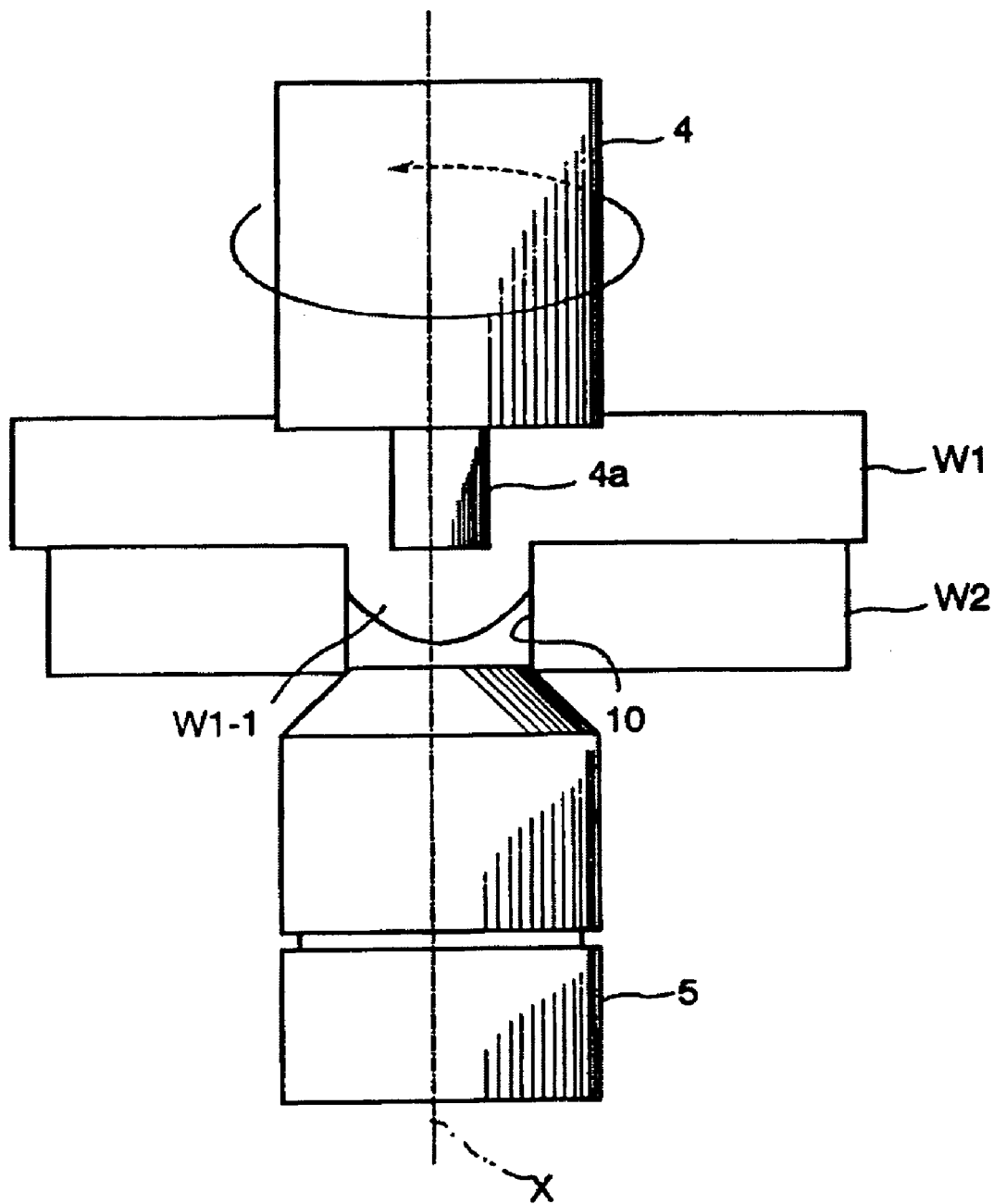
FIG. 3 is a side view showing details of the friction agitation welding for forming a weld across a joint between two superposed plate workpieces.
Figure 4:
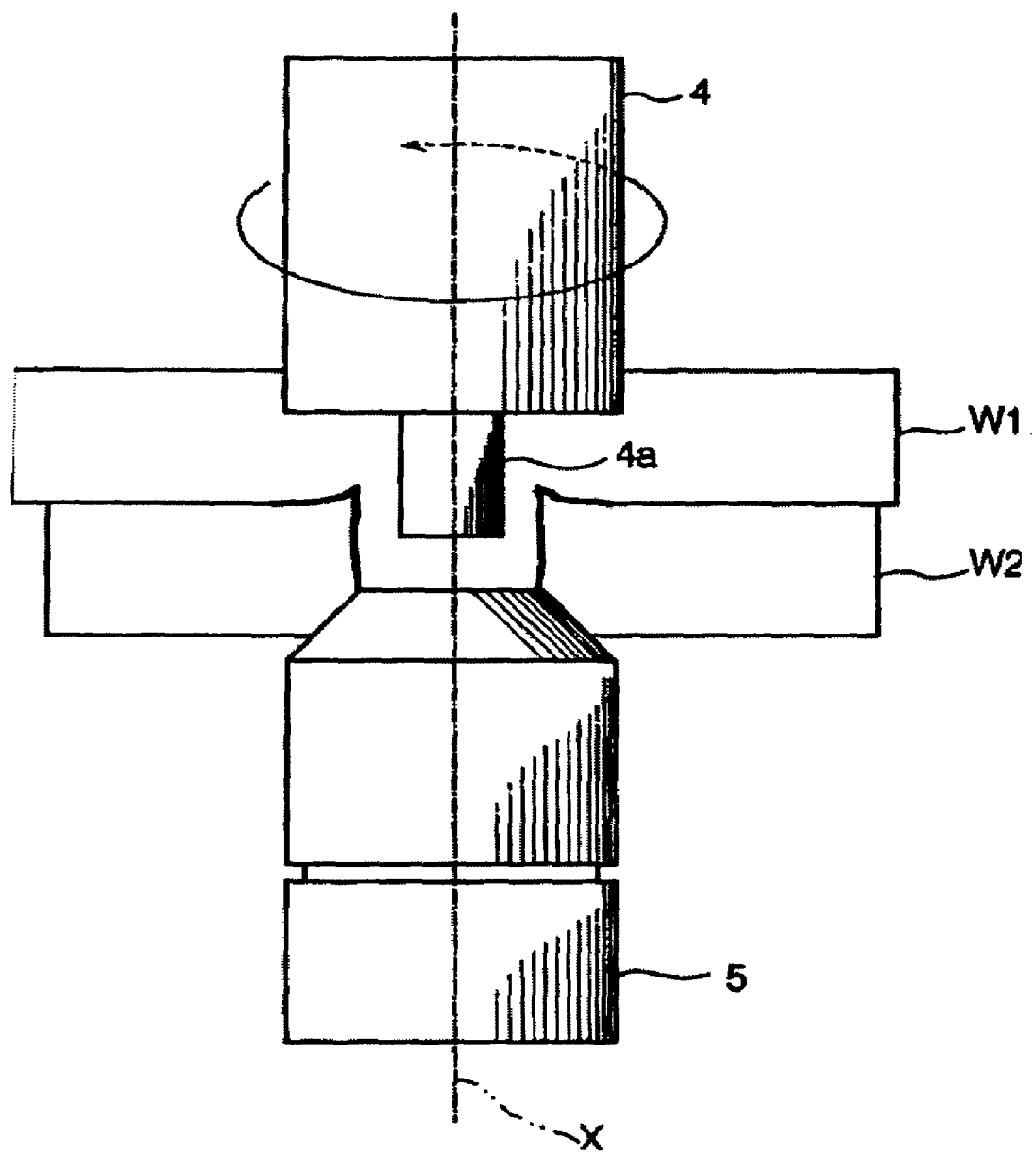
FIG. 4 is a side view showing details of the friction agitation welding in a progressed step.

FIGS. 3 and 4 show how friction agitation welding is made to form a weld across a joint between the superposed metal plate workpieces, namely a top plate workpiece W1 and a bottom plate workpiece W2 having a joint bore 10. When the friction agitation welding starts, the back-up tool 5 is brought into abutment against the bottom plate workpiece W2. Under this condition, while the friction agitation welding tool 4 is rotated and advanced toward the superposed metal plate workpieces. While the friction agitation welding tool 4 continues to rotate while urging between the friction agitation welding tool 4 and the top plate workpiece W1, it frictionally heats the material of the top plate workpiece W1 and causes the workpiece material so as thereby to plasticize it. When the friction agitation welding tool 4 continuously rotates and urges the superposed plate workpiece W1, a plasticized workpiece material W1-1 of the top plate workpiece W1 is forced downward by the cylindrical friction agitation spindle 4b of the friction agitation welding tool 4 and crammed into the joint bore 10 of the bottom plate workpiece W2. The rotation of the friction agitation welding tool 4 results in a plastic flow of the plastisized workpiece metal W1-1 around an axis of the cylindrical friction agitation spindle 4b in the joint bore 10, thereby forming a weld across the joint between the superposed plate workpieces W1 and W2.

The sequential operation of the welding robots 2 and the welding heads 1 are controlled by the controllers 3, respectively. As shown in FIG. 2, the controller 3 is electrically connected to the welding robot 2 through a harness 31 and to the welding head 1 including two motors through harnesses 32 and 33 including a relay box 34.

Referring back to FIG. 1, the safety fence 51 is provided with a plurality of doors 52 and a plurality of electromagnetic lock plugs 53 for locking and unlocking the doors 52, respectively. Each of the electromagnetic lock plug 53 is equipped with a safety plug (not shown) that is allowed to be unplugged while the electromagnetic lock plug 53 receives an unlock command signal from a process controller 54 but prevented from being unplugged while receiving a lock signal. The electromagnetic lock plug 53 is adapted to provide an emergency stop demand signal for urgently stopping the welding robots 2 to the process controller 54 when the safety plug is unplugged. In this instance, the unlock command signal is provided to the electromagnetic lock plugs 53 from the process controller 54 from the robot controller 3 only when all of the robot controllers 3 simultaneously provide unlock command signals to the process controller 54.

Figure 5:
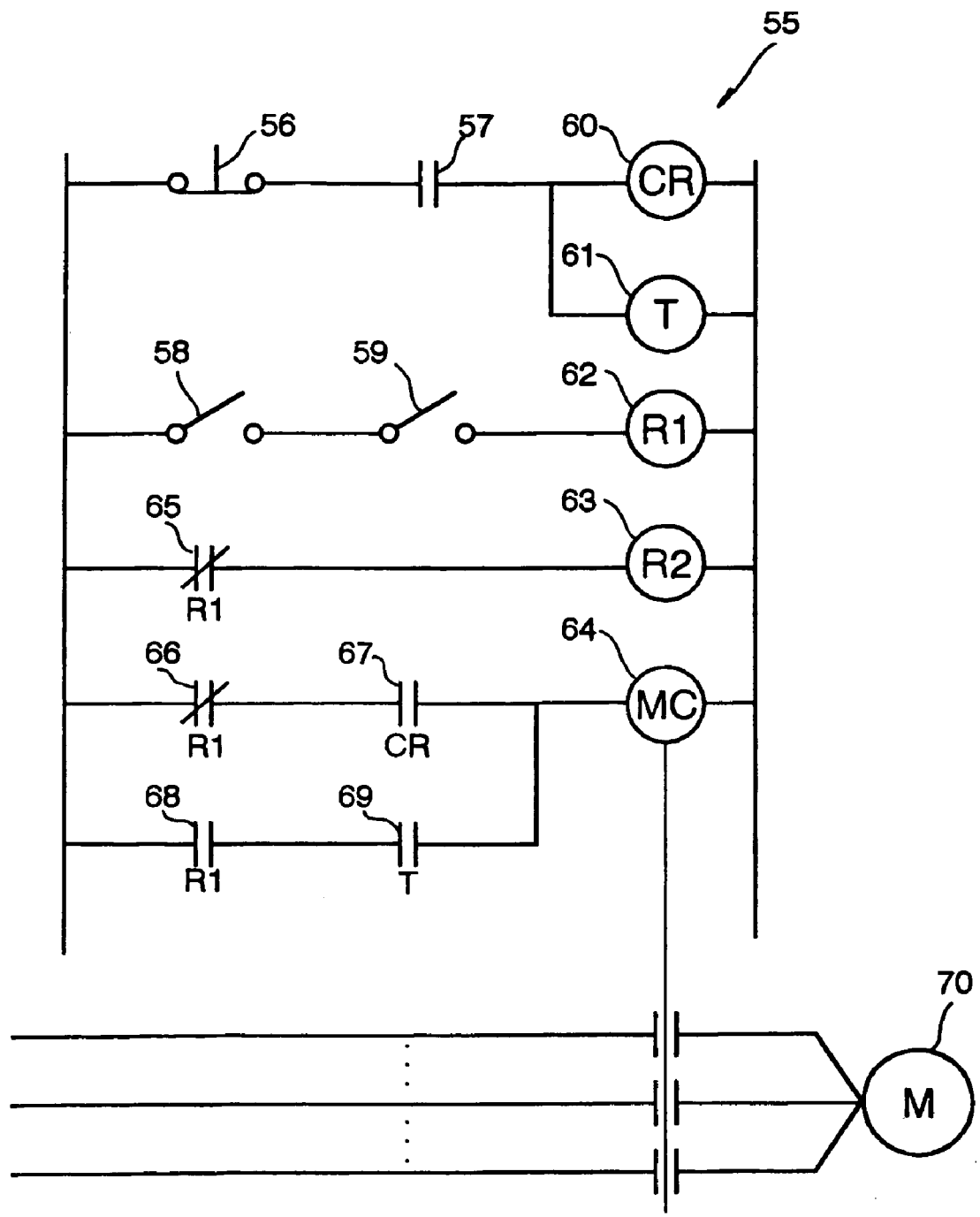
FIG. 5 is a sequence circuit for emergency stop control.

Referring to FIG. 5 showing an emergency stop circuit 55 of each of the robot controllers 3, the emergency stop circuit 55 includes an emergency stop button 56 and emergency stop contact 57. The emergency stop button 56 remains open when once it is pushed to open and is closed only when a reset switch (not shown) is operated. The emergency stop contact 57 are adapted to open and close in response to a presence of normal operating signal from incidental equipments such as a conveyer and emergency stop demand signals from the electromagnetic lock plug 53 and/or the incidental equipments. The emergency stop contact 57 remains closed while the incidental equipment provides a normal operating signal and, on the other hand, is opened when the incidental equipment provides an emergency stop demand signal. The incidental equipment is adapted to continuously provide an emergency stop demand signal until being reset when once the incidental equipment provides the emergency stop demand signal. Accordingly, the emergency stop contact 57 remains open until the incidental equipment is reset.

The emergency stop sequential control through the emergency stop circuit 55 in general friction agitation processing is such that, in execution of automatic operation of the processing robot 2 and the friction agitation processing by the processing head 1, the processing robot 2 continues to operate for a predetermined period of tome even when the emergency stop button 56 is pushed and then stops at a lapse of the predetermined period of time. This results in preventing the friction agitation processing tool 4 from being locked in the plasticized workpiece metal. In the predetermined period of time, the process controller 54 provides a lock signal to the electromagnetic lock plugs 53 to prevent the safety plug from being unplugged so as thereby to keep the doors 52 being closed. Accordingly, nobody can enter the working area S. On the other hand, while the friction agitation processing by the processing head 1 is suspended although the processing robot 2 executes the automatic operation, the sequential emergency stop control is such that when the emergency stop button 56 of any one of the robot controllers 3 is pushed, or when an emergency stop demand signal is provided from any one of the incidental equipments, all of the processing robots 2 are immediately brought down. More specifically, in the case where the friction agitation processing is applied to formation of a weld across a joint between superposed metal plate workpieces W1 and W2 as described in the above embodiment, when the emergency stop button 56 of any one of the robot controllers 3 is pushed, a relay (CR) 60 turns nonconductive with the consequence that a timer relay (T) 61 turns nonconductive at a lapse of a predetermined period of time. Emergency stop sequential control of the welding robot 2 and the welding head 1 is performed according to running operation states when the associated emergency stop button 56 is pushed.

When one of the robotic processing machines A is in a welding execution state where the welding head 1 executes the friction agitation welding while the welding robot 2 is automatically operated, switches 58 and 59 of the robot controller 3 of the robotic processing machines A in the sequential welding execution state are closed to cause a relay (R1) 62 to be live with an electric current, opening normally closed contacts 65 and 66 associated with the relay 62 and closing a normally open contact 68 associated with the relay 62. In this instance, the switch 58 is used to determine whether the welding robot 2 is executing the automatic operation or not. Specifically, the switch 58 remains closed while the welding robot 2 is automatically operated. The switch 59 is used to determine whether the welding head 1 is executing the friction agitation welding during execution of automatic operation of the welding robot 2 or not. Specifically, the switch 59 remains closed while the welding head 1 is operated to perform the friction agitation welding. When the emergency stop button 56 of any one of the welding robots 3 is pushed, the timer relay (T) 61 is turned nonconductive at a lapse of the predetermined period of time, a contact (T) 69 associated with the timer relay (T) 61 open to turn conductive after a predetermined period of time. A power source relay (MC) 70 is kept living with electricity for the predetermined period of time for which the contact (T) 69 remains closed, keeping motors of the welding robot 2 and the welding head 1 (that are comprehensively depicted by a symbol M) being electrically connected to an electric power source (not shown). When the contact (T) 69 opens to shut off an electric current to the power source relay (MC) 70 at a lapse of the predetermined period of time, the motors (M) of the welding robot 2 and the welding head 1 are disconnected from the electric power source. In other words, both welding robot 2 and welding head 1 continue to properly operate before a lapse of the predetermined period time and stop at a lapse of the predetermined period time. In this instance, it is preferred to set the predetermined period of time equal to or slightly longer than a time necessary to complete the friction agitation welding. Resulting from setting the predetermined period of time, the welding tool 4 continues to rotate until it is removed from the superposed metal plate workpieces after completion of the friction agitation welding even if the emergency stop button 56 is pushed. Therefore, the welding tool 4 is prevented from stopping rotation while staying in the metal plate workpiece and, in consequence, from being locked in a solidified workiece metal. This leads to causing damages of the tool and the metal plate workpiece even if the emergency stop button 56 is pushed. This prevents the welding tool 4 from being damaged and keeps the superposed metal plate workpieces from getting defective due to suspension of the friction agitation welding.

For the predetermined period of time during which both welding robot 2 and welding head 1 continue to operate even after the emergency stop button 56 has been pushed, the sequential welding execution state is held, so that the a relay (R1) 62 is caused to be live with an electric current. In consequence, the normally closed contacts 65 and 66 associated with the relay (R1) 62 are closed, cutting off a low of electric current through a relay (R2) 63. In this instance, the relay (R2) 63 is used to determine whether the robot controller 3 should provide an unlock command signal for the process controller 54 or not according to operation states. When the robotic processing machine A is a sequential welding inexecution state where at least either one of the automatic operation of the welding robot 2 and the friction agitation welding by the welding head 1 is not executed, the normally closed contacts (R1) 65 and 66 remain open, cutting off a low of electric current through a relay (R2) 63, so that the robot controller 3 does not provide an unlock command signal for the process controller 54. In this way, while the relay (R2) 63 is dead, at least the robot controller 3 associated with the dead relay (R2) 63 does not provide an unlock command signal for the process controller 54 of the electromagnetic lock plugs 53 are locked to prevent the doors 52 from opening. Therefore, while at least one of the welding heads 1 is operated in the sequential welding execution state, the operator is kept away from the working area S.

On the other hand, when one of the robotic processing machines A is in the sequential welding inexecution state, either one of the switches 58 and 59 is closed to shut off an electric current to the relay (R1) 62, keeping the associated normally closed contacts (R1) 65 and 66 closed. Therefore, when the emergency stop button 56 of one of the robot controllers 3 is pushed in the sequential welding inexecution state, a contact (CR) 67, that remains closed while the relay (CR) 60 is live with an electric current, turns open, shutting off an electric current to the power source relay (MC) 70. As a result, the motors of the welding robot 3 and the welding head 1 are immediately disconnected from the power source, suspending the welding robot 3 and the welding head 1.

The emergency stop sequential control as the emergency stop button 56 is pushed is also performed whenever any one of the incidental equipments stops in an emergency. For example, when any one of the incidental equipments is stopped in an emergency and, in consequence, provides an emergency stop demand signal for the robot controllers 3 through the process controller 54s a result, the contact 57 is opened to shut off an electric current from the relay (CR) 60 with the consequence that the timer relay (T) turns dead after a lapse of the predetermined period of time.

Although the friction agitation welding is applied to forming a weld across a joint defined by the joint bore 10 formed in the metal plate workpiece W2, it is now always necessary for the metal plate workpiece W2 to have a joint bore. In the case where the friction agitation welding of the present invention is applied to superposed metal plate workpieces both of which have no joint bore are welded, a weld is formed between the superposed metal plate workpieces resulting from a plastic flow produced at an interface therebetween.

Figure 6:
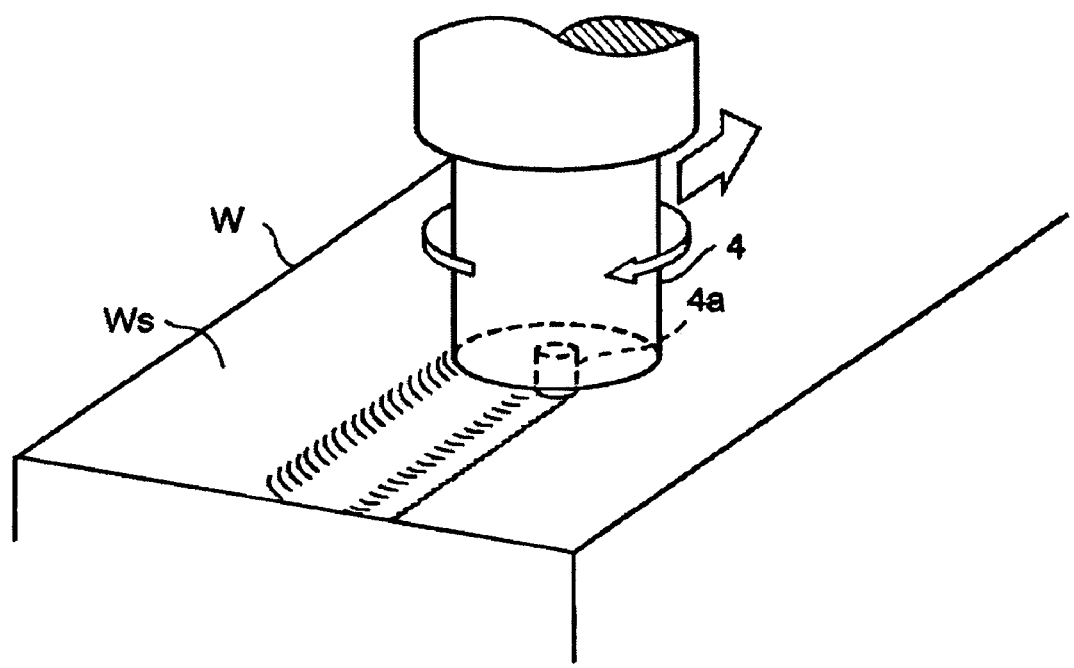
FIG. 6 is a schematic view of a friction agitation processing apparatus according to another preferred embodiment of the present invention.

FIG. 6 shows another preferred embodiment of the present invention in which a rotatably driven friction agitation tool 4 of the robotic processing machines A described in the previous embodiment is replaced with a rotatably driven friction agitation surface finishing tool 4B having a penetration spindle 4 for finishing a surface WS of a workpiece W. A robotic processing machine comprises a surface finishing robot, a process controller to which a plurality of the surface finishing robots are electrically connected and robot controllers associated with the surface finishing robots, respectively, and electrically connected to the process controller. The robot controller advances the friction agitation surface finishing tool 4 keeping the penetration spindle 4 penetrating the workpiece W with the consequence that a surface texture of the workpiece W is made dense resulting from a plastic flow of the workpiece material generated in the workpiece. The same emergency stop sequential control as described in the previous embodiment is performed in the robotic processing machine.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A friction agitation processing method of processing a workpiece by penetrating a rotating processing tool into the workpiece and removing the rotating processing tool from the workpiece after completion of friction agitation processing, said friction agitation processing method comprising the steps of:

mounting a processing tool to an automatic machine for putting said processing tool in position with respect to the workpiece:

providing an emergency stop demand signal for demanding a stop of said processing tool in an emergency;

stopping said automatic machine and said processing tool immediately upon appearance of said emergency stop demand signal while the friction agitation processing is unexecuted;

removing said processing tool from the workpiece after finishing scheduled friction agitation processing within a predetermined period of time from appearance of said emergency stop demand signal while the friction agitation processing is executed; and stopping rotation of the processing tool after operation of said automatic machine and subsequent to a lapse of said predetermined period of time.

2. A friction agitation processing method as defined in claim 1, wherein the friction agitation processing is applied to forming a weld across a joint between superposed metal plate workpieces.

3. A friction agitation processing apparatus for processing a workpiece by a processing tool that is penetrated into a workpiece keeping rotation and removed from the workpiece after friction agitation processing, said friction agitation processing apparatus comprising:

an automatic machine for holding a processing tool thereto and putting said processing tool in position with respect to the workpiece;

emergency stop means for providing an emergency stop demand signal for demanding a stop of the processing tool in an emergency;

execution detection means for detecting execution of the friction agitation processing by the processing tool;

timing means for stopping rotation of said processing tool after a lapse of a predetermined period of time from appearance of said emergency stop demand signal; and stop control means for stopping rotation of said processing tool and said automatic machine immediately upon appearance of said emergency stop demand signal from said emergency stop means when said execution detection means detects unexecution of the friction agitation processing, and finishing scheduled friction agitation processing within said predetermined period of time and subsequently stopping rotation of said processing tool and operation of said automatic machine, after removal of said processing tool from the work piece, upon appearance of said emergency stop demand signal from said emergency stop means when said execution detection means detects execution of the friction agitation processing.

4. A friction agitation processing apparatus as defined in claim 3, wherein the processing tool and said automatic machine are enclosed by a safety fence provided with a door and electromagnetic lock means for locking and unlocking the door, said electromagnetic lock means keeping said door locked until said finishing time.

5. A friction agitation processing apparatus as defined in claim 3, wherein the friction agitation processing is applied to forming a weld across a joint between superposed metal plate workpieces.

* * * * *